March 14, 1944. J. R. PEREZ 2,343,874
NUTCRACKING MACHINE
Filed Dec. 27, 1941 4 Sheets-Sheet 1
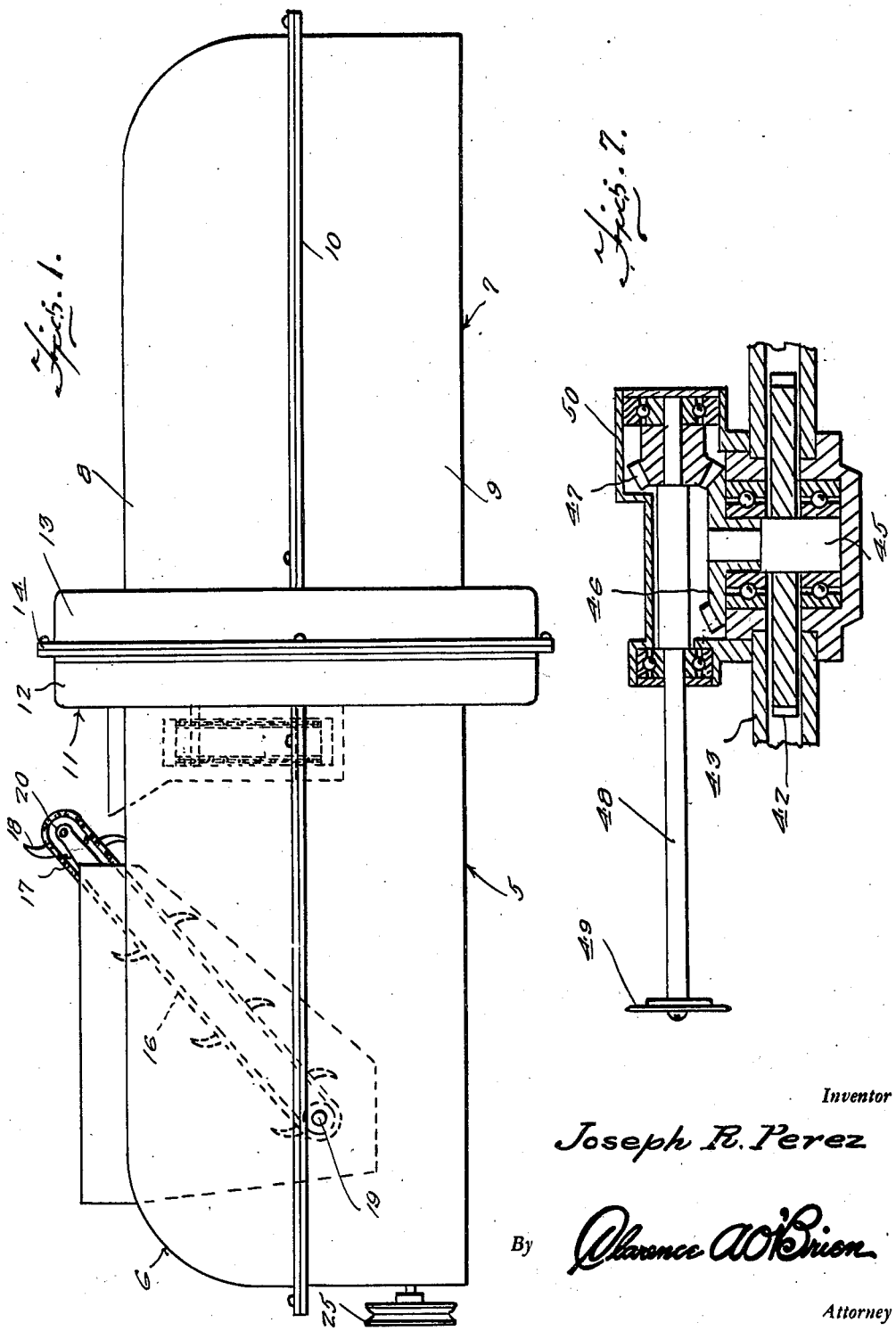
Inventor
Joseph R. Perez
By Clarence A. O'Brien
Attorney

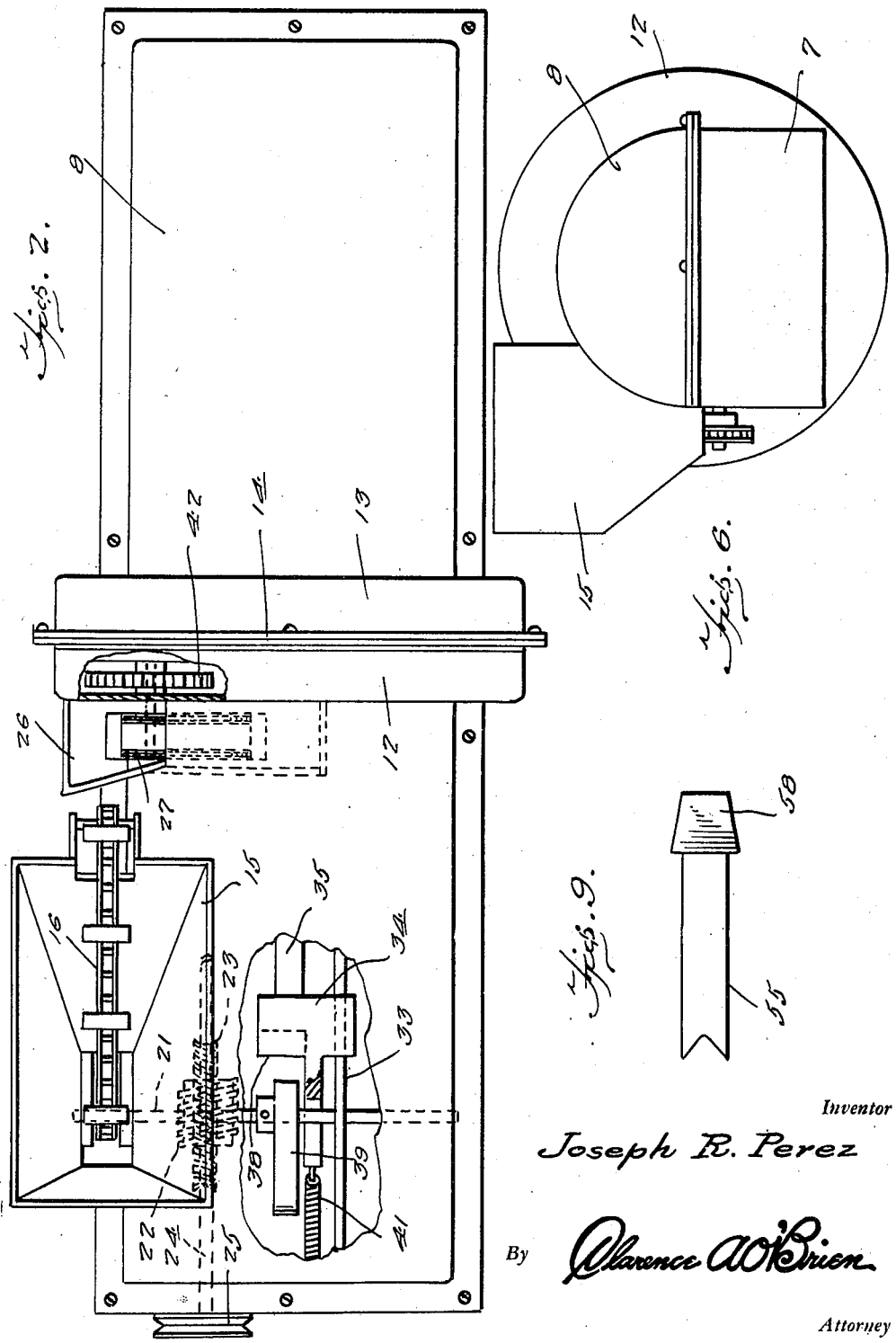

March 14, 1944.  J. R. PEREZ  2,343,874
NUTCRACKING MACHINE
Filed Dec. 27, 1941  4 Sheets-Sheet 3

Inventor
Joseph R. Perez
By Clarence A. O'Brien
Attorney

March 14, 1944. J. R. PEREZ 2,343,874
NUTCRACKING MACHINE
Filed Dec. 27, 1941 4 Sheets-Sheet 4
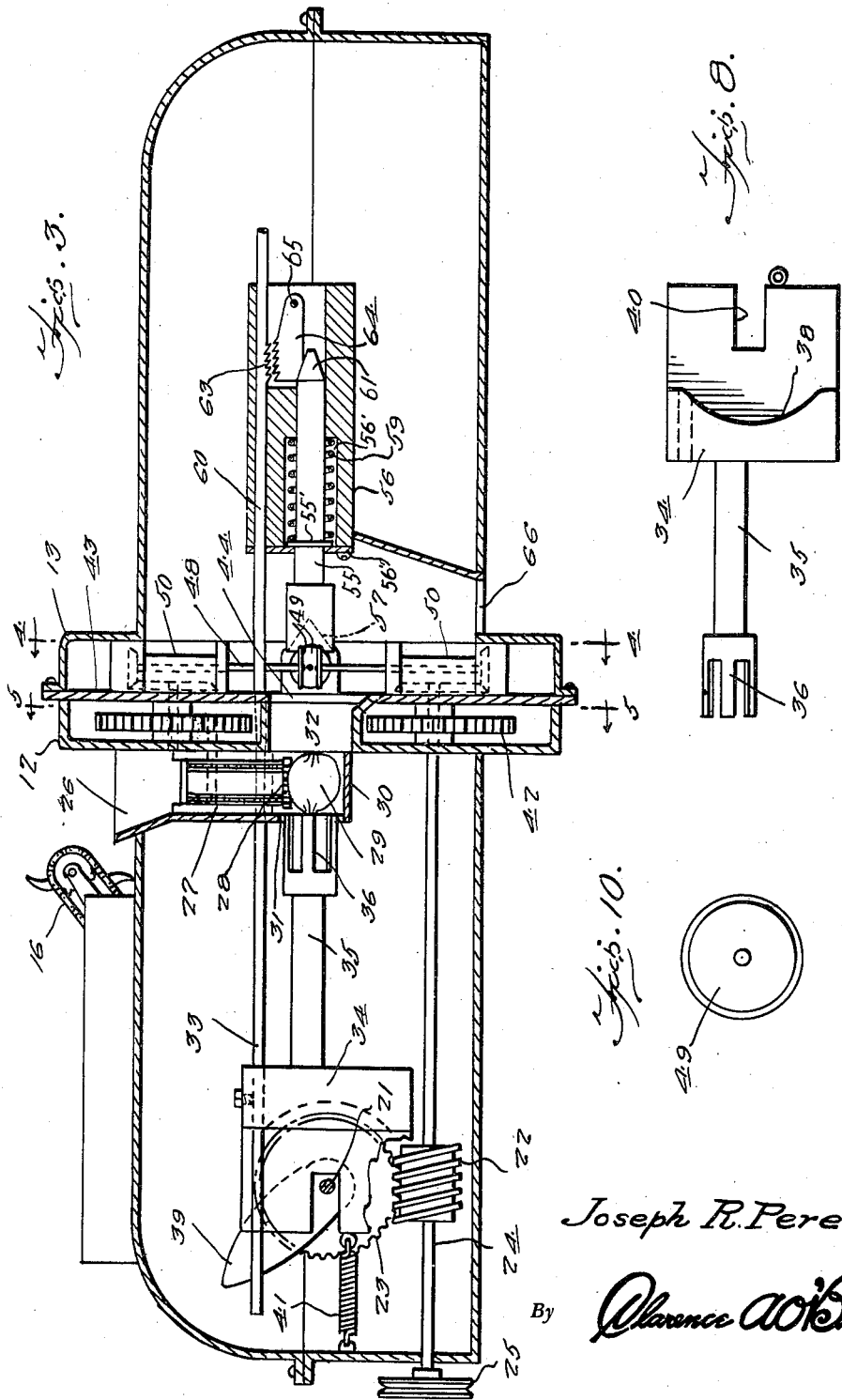
Inventor
Joseph R. Perez
By Clarence A. O'Brien
Attorney Patented Mar. 14, 1944

2,343,874

UNITED STATES PATENT OFFICE 2,343,874

NUT-CRACKING MACHINE

Joseph R. Perez, San Antonio, Tex.

Application December 27, 1941, Serial No. 424,633

2 Claims. (Cl. 146—10)

The present invention relates to new and useful improvements in nut-cracking or cutting machines designed primarily for use in cutting the shells of pecans and similar nuts and has for its primary object to provide means for feeding the nuts singly into engagement with a plurality of rotating cutters for cutting the shell of the nut longitudinally thereof and for cracking and removing the shell from the kernel of the nut upon the completion of the cutting operation.

A further object is to provide a machine of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view.

Figure 2 is a top plan view with parts broken away and shown in section.

Figure 3 is a longitudinal vertical sectional view.

Figure 4:
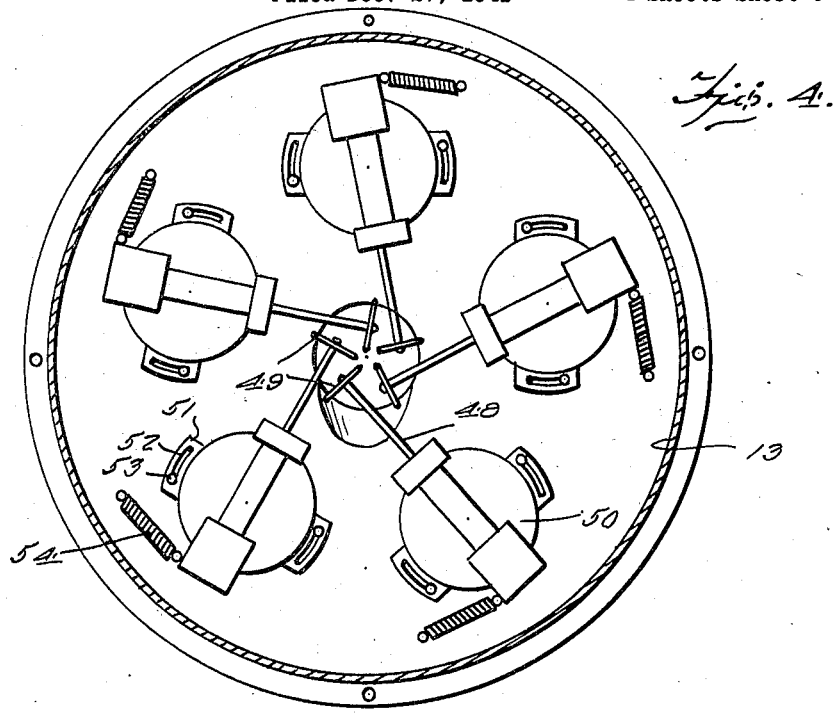
Figure 5:
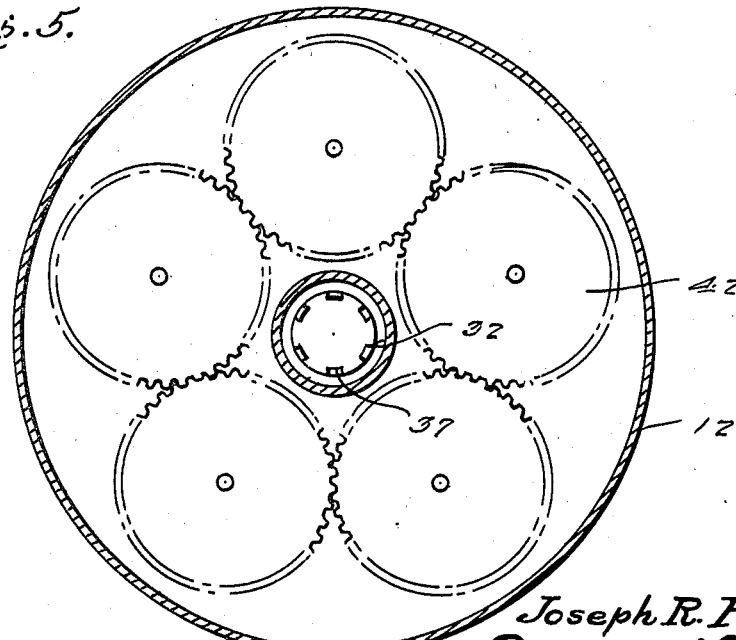

Figures 4 and 5 are vertical sectional views taken respectively on the lines 4—4 and 5—5 of Figure 3.

Figure 6 is an end elevational view.

Figure 7 is a sectional view through the gear housing for one of the rotating cutters.

Figure 8 is a side elevational view of the plunger for feeding the nut into engagement with the cutters.

Figure 9 is a side elevational view of the adjustable anvil for the nut, and

Figure 10 is an end elevational view of one of the rotating cutters.

Referring now to the drawings in detail, wherein for the purpose of illustration I have disclosed a preferred embodiment of the invention, the numeral 5 designates a casing generally including wing portions 6 and 7, each wing portion being formed of upper and lower sections 8 and 9 connected by flanges 10 and the wing portions are connected to a center housing 11 formed of sections 12 and 13 connected by flanges 14.

At one side of the upper section 8 of the wing section 6 is a hopper 15 open at its top and adapted to receive a quantity of pecans or other nuts, the hopper having positioned therein an endless conveyor 16 comprising a chain 17 having blades 18 attached thereto, the chain travelling over a lower sprocket 19 and an upper sprocket 20. The lower sprocket 19 is driven by a shaft 21 having a worm 22 thereon operated by a worm wheel 23 from a drive shaft 24 extending outwardly through one end of the lower section of the wing 6 and having a drive pulley 25 at its outer end for operation by a suitable source of power.

The upper end of the conveyor 16 is disposed in a position for discharging the nuts singly into a hopper 26 extending downwardly through the upper section 8 of the wing section 6 and positioned in the hopper 26 is an endless conveyor 27 provided with blades 28 in the form of a plurality of spring fingers for feeding the nuts 29 downwardly to the bottom 30 of the hopper 26, as shown to advantage in Figure 3 of the drawings.

The wall of the hopper 26, adjacent the bottom portion, is formed with an opening 31 in one side and at an opposite side is formed with a passage 32 leading into the housing 11.

The upper section 8 of the wing 6 is provided with a guide rod 33 on which is slidably mounted the head 34 of a plunger 35 having a plurality of spring fingers 36 at one end for movement through the opening 31 of the hopper 26 for frictionally receiving and engaging the nuts 29. The head 34 of the plunger 35 includes an arcuate edge 38 adapted for engagement by a cam 39 secured on the shaft 21. The head 34 also includes a slot 40 to accommodate the shaft 21 during reciprocation of the plunger. A coil spring 41 is attached to the head 34 and connected to the housing to retract the plunger after actuation thereof by the cam 39.

Journaled in the housing section 12 are a plurality of gears 42, one of said gears being secured on the shaft 24 and all of said gears being engaged, as shown to advantage in Figure 5 of the drawings, the axis of the gears being concentric with respect to the passage 32.

Between the housing sections 12 and 13 is a plate member 43 having an opening 44 in communication with the passage 32 and journaled in the plate are the shafts 45 to which the gears 42 are secured. The shafts 45 project into the housing section 13 at the side of the plate 43 opposite from the gears and secured on said projecting ends of the shafts 45 are bevelled gears 46 engaging similar gears 47 secured on a drive shaft 48 and on one end of which is secured a disk cutter 49. The gears 46 and 47 are enclosed within a circular housing 50 in which the shaft 48 is also journaled, the housing having ears 51 projecting from diametrically opposite sides and formed with arcuate slots 52 in which pins 53 are slidably positioned. Coil springs 54 engage the housing 50 to maintain the pins 53 in one end of the slot 52 and with the cutters 49 disposed in substantially close relation with each other and in the path of the nuts passing through the passage 32 and the opening 44. The cutters 49 and the housing 50 are yieldable to the pressure of the nuts for expanding purposes to rock the housings 50 about the shafts 45 to provide sufficient opening for the passage of the nuts between the blades as the nuts are forced against the cutters by the plunger 35.

An anvil 55 is slidably mounted in a support 56 in the housing section 7, one end of the anvil having a notch 57 formed therein and disposed in the path of the nuts as the same leave the cutters 49. The other end of the anvil is slidably mounted in the support 56 and yieldably urged forwardly in a direction toward the cutters by a coil spring 59 positioned in a chamber 56' of the support 56, the spring engaging a flange 55' on the anvil. The flange 55' abuts a cover plate 56'' for the chamber 56' to limit forward movement of the anvil and to prevent contact thereof with the cutters. The throw of the anvil in a direction toward the nut is controlled by a rack bar 60 slidably mounted in the support 56. The teeth 63 of the rack bar are engaged by a toothed dog 64 pivoted as at 65 to the support 56. The rear end of the anvil is tapered as shown at 61 and the lower edge of the dog 64 is correspondingly beveled for riding against the tapered end of the anvil.

In the operation of the device the nuts are fed singly into the chamber 30 whereupon the nuts are fed singly into the chamber 30 whereupon the nuts are engaged by the plunger 35 during the reciprocation thereof by the cam 39 and the nuts are then forced through the passage 32 into a position for engagement by the knives 49 which are rotated by the gears 42. As the knives cut the nuts 29 longitudinally the nuts are forced against the anvil 59 for crushing the shell of the nut, after which they are dropped through the opening 66 in the bottom of the housing into a suitable receptacle.

It is believed the details of construction and manner of use of the device will be readily understood from the foregoing without further detailed explanation.

Having thus described the invention what I claim is:

1. A nut cracking machine comprising a gear housing having a central opening, a feed chute at one side of the housing adapted to support a nut at the bottom of the chute, said chute having openings in its opposite sides in alignment with the opening of the housing, a plunger having a plurality of spring fingers movable through one of the openings of the chute for engaging the nut and forcing the same through the opening in the housing, means for reciprocably actuating the plunger, a plurality of gear housings pivoted to the first-named gear housing at the side thereof opposite from the chute and arranged in a circle about said first-named opening, a shaft projecting from each of said last-named housings, a cutter on each shaft in the path of nuts moving through the openings and an anvil in the path of the nut beyond the cutters.

2. A nut cracking machine comprising a gear housing having a central opening, a feed chute at one side of the housing adapted to support a nut at the bottom of the chute, said chute having openings in its opposite side in alignment with the opening of the housing, a plunger having a plurality of spring fingers movable through one of the openings for engaging the nut and forcing the same through the opening in the housing, a head on the plunger having an arcuate striking surface, a cam engaging the striking surface of the plunger to move the same against the nut, spring means for retracting the plunger, a plurality of cutters arranged in circular relation in the path of the nut, a shaft for each cutter, a mounting for each shaft pivoted to the side of the gear housing opposite from the chute to provide for an expanding movement of the cutters upon contact by the nut, means for rotating the shafts, and an anvil in the path of the nut beyond the cutter.

JOSEPH R. PEREZ.